United States Patent [19]

Fukui

[11] 4,207,804
[45] Jun. 17, 1980

[54] CRAWLER TYPE VEHICLE DRIVING APPARATUS

[76] Inventor: Kiyozumi Fukui, 1468-1, Goshono, Tarui-cho, Fuwa-gun, Gifu-ken, Japan

[21] Appl. No.: 907,043

[22] Filed: May 17, 1978

Related U.S. Application Data

[63] Continuation-in-part of Ser. No. 664,637, Mar. 8, 1976, abandoned.

[30] Foreign Application Priority Data

Mar. 14, 1975 [JP] Japan .................................. 50-31517
Jul. 4, 1975 [JP] Japan .................................. 50-82948
Jul. 10, 1975 [JP] Japan .................................. 50-84648

[51] Int. Cl.² ........................ F01B 13/04; B62D 11/00
[52] U.S. Cl. ................................. 91/499; 180/6.48; 180/307
[58] Field of Search .................... 91/499, 506; 180/66, 180/6.48

[56] References Cited

U.S. PATENT DOCUMENTS

| 2,353,730 | 7/1944 | Joy ........................................ 91/503 |
| 2,430,528 | 11/1947 | Moon .................................... 91/499 |
| 2,437,887 | 3/1948 | Mott ...................................... 91/499 |
| 2,437,896 | 9/1966 | Terlto .................................... 91/499 |
| 3,439,766 | 4/1969 | Dente et al. ....................... 180/66 F |
| 3,535,984 | 10/1970 | Anderson ............................. 91/506 |
| 3,808,949 | 5/1974 | Muncke et al. .................... 91/473 |
| 3,865,207 | 2/1975 | Schwab .............................. 180/66 F |
| 3,893,531 | 7/1975 | Gee ..................................... 180/6.48 |
| 3,960,061 | 6/1976 | Campbell ............................ 91/506 |

FOREIGN PATENT DOCUMENTS

1806022 5/1970 Fed. Rep. of Germany ......... 180/66 F
1335666 10/1973 United Kingdom ..................... 91/506

Primary Examiner—William L. Freeh
Attorney, Agent, or Firm—Haseltine, Lake & Waters

[57] ABSTRACT

A crawler type vehicle driving apparatus which is designed to be compact in construction and readily be disassembled and reassembled. The apparatus comprises a rotating assembly having a bore extending along its rotational axis, a motor housing fixedly supported by a stationary frame structure and accommodated in the bore of the rotating assembly through bearings for rotatably supporting the rotating assembly, a hydraulic motor accommodated in the motor housing to be removed from one side of the rotating assembly, and a reduction gear unit detachably attached to the other side of the rotating assembly in driving engagement with the hydraulic motor.

17 Claims, 6 Drawing Figures

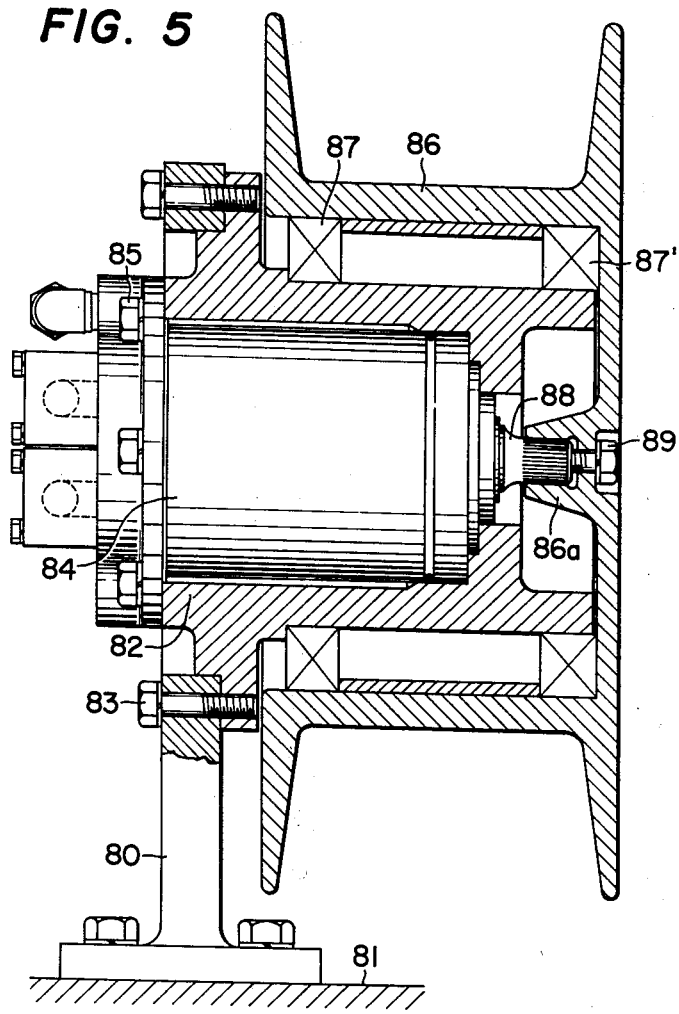

CRAWLER TYPE VEHICLE DRIVING APPARATUS

CROSS RELATED APPLICATION

This Application is a continuation-in-part of Ser. No. 664,637 filed Mar. 8, 1976 now abandoned.

FIELD OF THE INVENTION

This invention relates to a crawler type vehicle driving apparatus such as a bulldozer, shovel loader and the like which requires low speed and high torque and more particularly to an apparatus which is designed to be smaller in size by combination of a hydraulic motor as minimized as possible to be attached to a vehicle body and having relatively low torque and high speed, and a reduction gear unit for converting the output of the hydraulic motor into desired high torque and low speed.

BACKGROUND

There has been proposed a variety of such apparatus comprising a hydraulic motor and a reduction gear unit for transmitting power to an endless belt with a reduced speed and a high torque, wherein the hydraulic motor and the reduction gear unit usually projected beyond the width of the endless belt. This frequently resulted in damage thereto when they collided with hard obstacles upon running of the vehicle body. Moreover, it is troublesome and laborious to assemble and disassemble mechanical parts of the conventional apparatus.

SUMMARY OF THE INVENTION

It is therefore a first object of the present invention to provide a crawler type vehicle driving apparatus comprising mechanical parts which are all arranged within the width of the endless belt.

It is a second object of the present invention to provide a crawler type vehicle driving apparatus wherein a motor housing accommodating a hydraulic motor therein is coupled with an attachment bore formed in a frame structure to rotatably support a rotating assembly for driving the endless belt, and a reduction gear unit is provided for transmitting power from the hydraulic motor to the rotating assembly at a reduced speed and a high torque.

It is a third object of the present invention to provide a crawler type vehicle driving apparatus which comprises two bearings arranged between the motor housing and the rotating assembly to equally receive loads of the vehicle body exerted thereupon so as to minimize the size of bearings, resulting in small size in the radial direction of the apparatus.

It is a fourth object of the present invention to provide a crawler type vehicle driving apparatus wherein the motor housing, the reduction gear unit and the rotating assembly are detachable as a unit to and from the frame structure in the axially outward direction of the endless belt and wherein a sprocket wheel constituting the rotating assembly is also detachable to and from a rotating member constituting the rotating assembly in the axially outward direction of the endless belt.

It is a fifth object of the present invention to provide a crawler type vehicle driving apparatus wherein all the mechanical parts of the hydraulic motor are detachable to and from the motor housing in the axially inward direction of the endless belt and all the mechanical parts of the reduction gear unit and the bearings can be separated in the axially outward direction of the endless belt.

It is a sixth object of the present invention to provide a crawler type vehicle driving apparatus wherein a specific configuration of the motor housing is contemplated around its portions attached to the frame structure and around the bearings so as to provide increased mechanical strength even with small size.

It is a seventh object of the present invention to provide a crawler type vehicle driving apparatus wherein the sprocket wheel of the rotating assembly is engaged with the axially central portion of the endless belt so as to enable the hydraulic motor and the reduction gear unit to be disposed within the width of the endless belt.

In order to accomplish these foregoing objects, a crawler type vehicle driving apparatus comprises in combination: a motor housing; and a hydraulic motor housed in the motor housing and including a rear casing having a pair of fluid passages provided therein, a timing plate integrally engaged with the front surface of the rear casing and having a pair of distributing passages in fluid communication with the fluid passages in the rear casing, a piston cylinder assembly operably mounted at the front surface of the timing plate and having an axis of rotation, an inclined plate operably mounted at the front surface of the piston cylinder assembly, an output shaft positioned along the axis of the piston cylinder assembly and rotated in unison with the piston cylinder assembly, a retaining member holding said rear casing and the inclined plate so as to permit the hydraulic motor to be easily removed and attached as a single unit from and into the motor housing, positioning means securely mounted on a peripheral portion of the inclined plate to provide desired relative positions of the motor housing and the inclined plate, a bearing positioned between the inclined plate and the output shaft for rotatably engaging the inclined plate with the output shaft, and a holding member for retaining the bearing in its predetermined position.

BRIEF DESCRIPTION OF THE DRAWING

The features and advantages of the crawler type vehicle driving apparatus according to the present invention will become apparent from the following description taken in conjunction with the accompanying drawings, in which

FIG. 5 is a cross-sectional view similar to FIG. 3 but showing another embodiment of the present invention.

DETAILED DESCRIPTION

Figure 1:
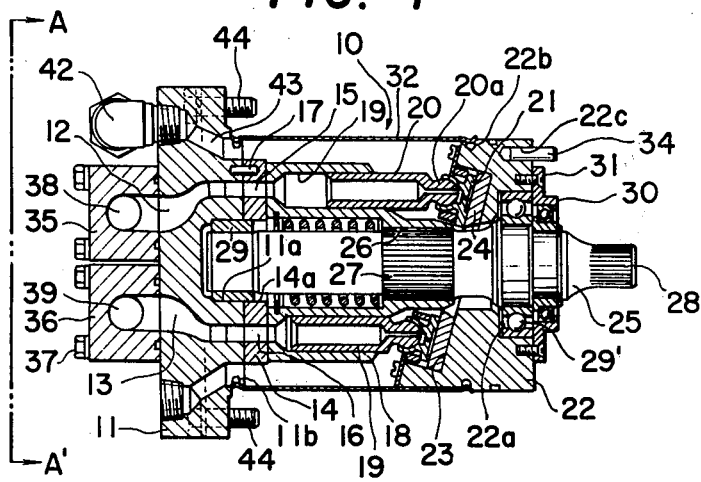
FIG. 1 is a cross-sectional view of a hydraulic motor to be accommodated in a motor housing constituting a component of a driving mechanism of a crawler type vehicle driving apparatus in accordance with one embodiment of the present invention.
Figure 2:
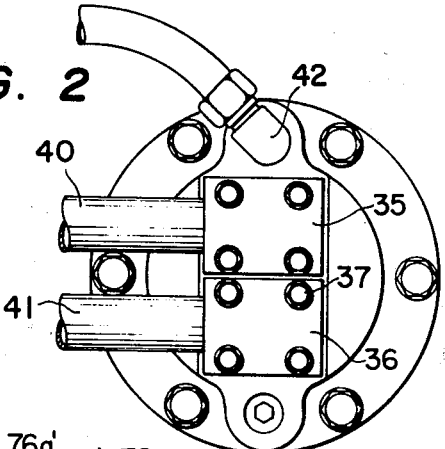
FIG. 2 is a rear view as seen from lines A—A' in FIG. 1.

Reference will now be made to FIGS. 1 to 5, especially to FIG. 1. The crawler type vehicle driving apparatus in accordance with the present invention is shown comprising a hydraulic motor, generally designated at 10, which includes a rear casing 11 formed with a pair of fluid passages 12 and 13. Each of the fluid passages 12 and 13 is formed in a substantially arcuate shape at the front surface thereof. A timing plate 14 has a rear surface in contact with the front surface of the rear casing 11 and is provided with a pair of distributing passages 15 and 16 which are in fluid communication with the fluid passages 12 and 13, respectively. The timing plate 14 is adapted to be integrally engaged or coupled with the rear casing 11 by means of one or more positioning pin members 17 so as to prevent circumferential rotation or movement thereof. A cylinder block 18 has a rear surface positioned in contact with the front surface of the timing plate 14 and is provided with a number of axial bores 19 extending parallel with each other and in fluid communication with the distributing passages 15 and 16, respectively, of the timing plate 14. A reciprocable piston 20 is slidably accommodated in each of the axial bores 19 to effect a reciprocating motion by a pressure oil supplied to and discharged from the bore 19. At the front end of the piston 20 is formed a spherical head 20a which is adapted to be in universal coupling with a corresponding shoe member 21. An inclined plate 22 is formed with an inclined recess or cavity 23 opposite the pistons 20 and receiving a thrust plate 24 in abutting engagement with the shoe member 21. An output shaft 25 is positioned in coaxial relation with the cylinder block 18 and has an intermediate splined portion 27 in mesh with a splined portion 26 at a radially inner wall of the cylinder block 18. The front end portion 28 of the output shaft 25 is splined and in meshing relation with a hollow splined shaft which will be described hereinafter in greater detail. Both end portions of the output shaft 25 are rotatably supported by bearings 29 and 29', the latter of which is received in an annular groove 22a of the inclined plate 22 and retained by an annular holding member 30 bolted at 31 to the inclined plate 22, the annular holding member 30 accommodating therein an oil seal for preventing oil from leaking from the hydraulic motor 10, while the bearing 29 is received in a circular groove 11a of the rear casing 11 in an axial aperture 14a of the timing plate 14. A metal cylindrical member 32 surrounds the timing plate 14, the cylinder block 18 and the pistons 20 and has both axially outer ends securely connected to the peripheral walls of the rear casing 11 and the inclined plate 22. More specifically, the walls of the rear casing 11 and the inclined plate 22 are formed with several holes 11b and 22b, respectively, in which are punchedly secured both axially outer ends of the cylindrical member 32 so as to prevent relative circumferential rotation or movement of the rear casing 11 and the inclined plate 22. A radially outer end portion of the inclined plate 22 is formed with a hole 22c which extends parallel to the output shaft 25 and receives a positioning pin member 34 as will be described later in greater detail. As shown in FIGS. 1 and 2, a pair of conduit joints 35 and 36 are securely mounted on the rear surface of the rear casing 11 by means of bolts 37 and have joint passages 38 and 39, respectively, which are in fluid communication with the fluid passages 12 and 13, respectively, of the rear casing 11. The conduit joints 35 and 36 are designed to be in fluid connection with a suitable pressure oil source (not shown) through conduits 40 and 41, respectively. A drain pipe 42 is in fluid communication with a chamber within the cylindrical member 32 through a bore 43 formed in the rear casing 11. The rear casing 11 is attached by means of bolts 44 to a motor housing as will become apparent, so that the hydraulic motor 10 may be detachably secured as a single unit to the motor housing for facilitating disassembling and reassembling operations upon repair or replacement thereof.

Figure 3:
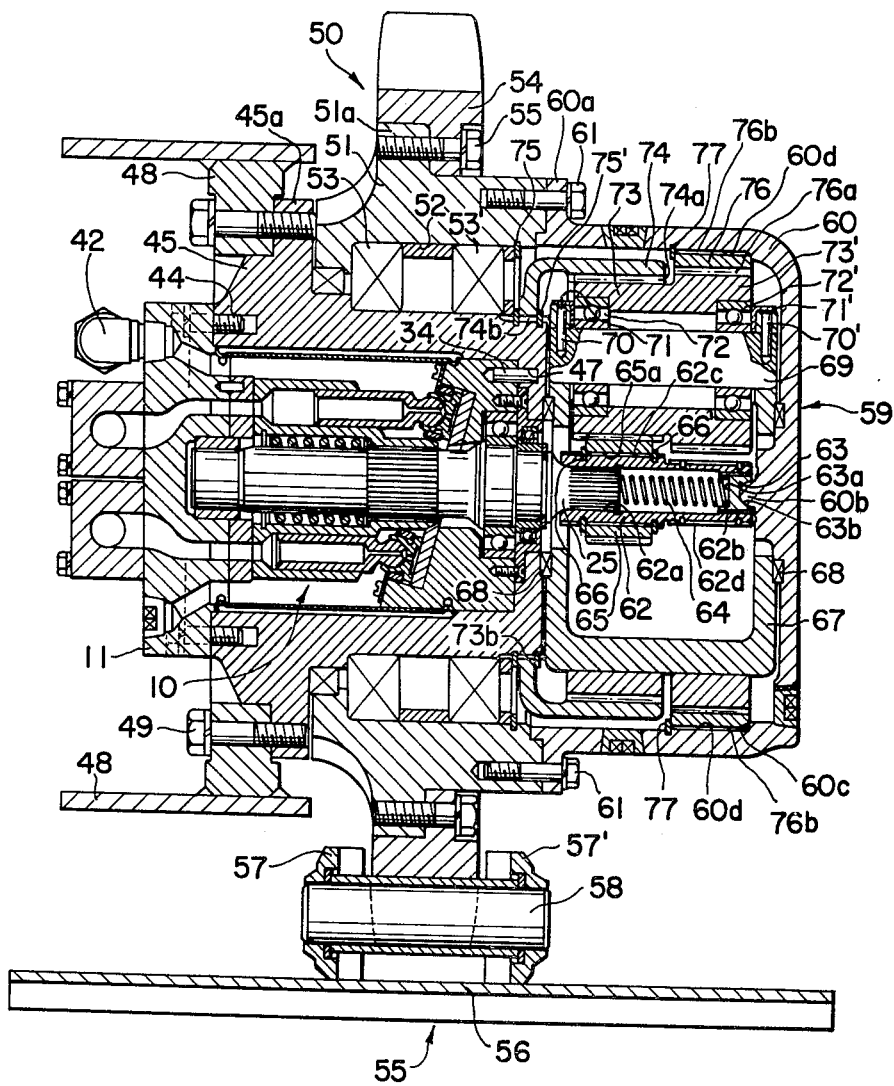
FIG. 3 is a cross-sectional view of a crawler type vehicle driving apparatus in accordance with one embodiment of the present invention.

In FIG. 3, the rear casing 11 is seen as fixed to the motor housing 45 by means of the bolts 44 so as to have the hydraulic motor 10 snugly accommodated in the motor housing 45. Prior to the attachment of the rear casing 11 to the motor housing 45, the positioning pin member 34 is fitted into a hole 47 formed at the bottom of the motor housing 45 so that the hydraulic motor 10 is positioned in the motor housing 45. The motor housing 45 has at its rear end an annular flange 45a which is detachably secured to a stationary frame structure 48 by means of bolts 49 so that the motor housing 45 can be fixedly supported by the frame structure 48. A rotating assembly, generally designated by the reference numeral 50, is disposed in surrounding relative to the motor housing 45 and comprises a rotating member 51 which is formed with an axial bore 52 rotatably accommodating the motor housing 45 through bearings 53 and 53'. At the periphery of the rotating member 51 of the rotating assembly 50 there is formed an annular flange portion 51a to which is detachably secured a sprocket wheel 54 by means of bolts 55. With the accommodation of the motor housing 45 in the axial bore 52 of the rotating member 51 of the rotating assembly 50, it is possible to make the driving mechanism of the present invention extremely compact in construction as a whole. In addition, the motor housing 45 may be readily removed from one side of the rotating assembly 50. An endless belt, generally designated by the reference numeral 55, consists of series of flat treads 56 of which has a pair of spaced legs 57 and 57' inwardly projected from the inner wall thereof. The legs 57 and 57' fixedly support both ends of a pin member 58 which is engageable with the sprocket wheel 54 of the rotating assembly 50.

The reduction gear unit which is generally designated by the reference numeral 59 comprises a covering member 60 having at its open ends an annular flange 60a which is detachably fixed to the forward end of the rotating member 51 of the rotating assembly 50 by means of several bolts 61. Within the covering member 60 is positioned a hollow shaft 62 which has a splined rear inner wall 62a in mesh with the splined front end portion 28 of the output shaft 25. The front inner wall 62b of the hollow shaft 62 is splined to be in meshing relation with an outer periphery of a spring retainer 63 which has a circular groove 63a opposite the output shaft 25. A compression spring 64 is interposed between the front end of the output shaft 25 and the circular groove 63a of the spring retainer 63. The covering member 60 is integrally formed with a protrusion 60b slidably engaged with a cavity 63b formed at the front end of the spring retainer 63. The hollow shaft 63 has rear and front splined outer walls 62c and 62d, the former of which is in mesh with a splined axial bore 65a of a sun gear 65 securely mounted on the hollow space 62 by snap rings 66 and 66'. A planet carrier 67 is housed within the covering member 60 and rotatably supported by the motor housing 45 and the covering member 60 through bearings 68 and 68'. To the radially outer portion of the planet carrier 67 are attached a cluster of planet shafts 69 by means of pin members 70 and 70' and pin covers 71 and 71'. Each of the planet shafts 69 rotatably supports, through bearings 72 and 72', first and second planet gears 73 and 73' which are integrally formed with each other. The first planet gear 73 is in meshing relation with the sun gear 65 and a radially inner toothed wall 74a of a fixed annular ring gear 74 which has a rear end 74b in splined relation with the front end periphery of the motor housing 45. A pair of snap rings 75 and 75' fix the rear end 74b of the annular ring gear 74 to the front end periphery of the motor housing 45. An output ring gear 76 is securely mounted on the inner wall of the covering member 60 by a snap ring 77 and a ledge 60c formed on the inner wall of the covering member 60, while having a radially inner toothed wall 76a in mesh with the second planet gear 73'. The radially outer wall 76b of the output ring gear 76 is adapted to be in splined engagement with the inner wall 60d of the covering member 60.

The operation of the driving mechanism thus constructed and arranged will now be described with reference to FIGS. 1 and 3.

When pressure oil is supplied and discharged through the conduits 40, 41 and the joints 35, 36, the cylinder block 18 is caused to rotate while the pistons 20 are reciprocated by the action of the pressure oil supplied and discharged through the fluid passages 12, 13 and the distributing passages 15, 16 so that the output shaft 25 is caused to rotate in the usual manner. The rotation of the output shaft 25 permits the rotating assembly 50 to be rotated by way of the hollow shaft 62, the sun gear 65, the first and second planet gears 73 and 73', the output ring gear 76 and the covering member 60, thereby causing the endless belt 55 to be rotated.

Figure 4:
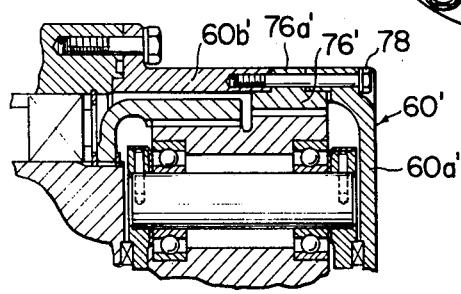
FIG. 4 is a fragmentary cross-sectional view partly showing another ring gear to be used in a crawler type vehicle driving apparatus.

While the above embodiment of the present invention has been described assuming that the cylindrical member 32 connecting the rear casing 11 and the inclined plate 22 is made of a metal, the cylindrical member 32 may be made of any other materials, such as, plastic, hardened rubber and the like, capable of preventing the rear casing 11 and the inclined plate 22 from relative circumferential rotation or movement. The cylindrical member 32 may be perforated to have many tiny bores, however, it is most preferable that the cylindrical member 32 has no perforations for preventing dirt or dust from attaching to the mechanical parts within the cylindrical member 32. In the above embodiment of the present invention, it has been described that the positioning pin member 34 in the hole 22c of the inclined plate 22 is inserted into the hole 47 of the motor housing 45, however, any other positioning means such as a key, spline and clutch may be used in the present invention. All the above positioning means are required to have such a function to absorb the rotational torque of the inclined plate 22 under rotation of the hydraulic motor 10 other than the above positioning function. Although the rear casing 1 and timing plate 14 are engaged with each other by means of the pin member 17 in the foregoing embodiment of the present invention, any other engaging means may be employed in place of the pin member 17 for the purpose of engagement of the rear casing 11 and the timing plate 14 in the present invention. Any other conventional driven wheels may be attached to the rotating member 51 of the rotating assembly 50 according to the present invention. While the ring gear 76 is assumed to be securely mounted on the inner wall of the covering member 60 by the snap ring 77 and the ledge 60c formed on the inner wall of the covering member 60 in the above-mentioned embodiment, the ring gear may be securely mounted on the covering member as will be described later according to the present invention. Referring to FIG. 4, the covering member 60' is illustrated to have two divided elements 60a' and 60b' which interpose an annular projection 76a' formed on the radially outer periphery of a ring gear 76'. The annular projection 76a' is clamped to the elements 60a' and 60b' by means of bolts 78.

As will be seen in FIG. 5, the hydraulic motor may be used as a driving source for a winding drum for winding a rope, a wire and the like in the present invention although it is assumed to drive an endless belt of a caterpillar in the foregoing embodiment.

In FIG. 5, an upstanding support 80 is bolted to a base frame 81 and has an upper portion securely connected by bolts 83 to a motor housing 82 within which a hydraulic motor 84 is accommodated and securely attached to the rear face of the motor housing 82 by bolts 85. A winding drum 86 is rotatably supported by the motor housing 82 through bearings 87 and 87' and has a hub 86a axially inwardly extedning to be in splined engagement with the forward end of an output shaft 88 of the hydraulic motor 84. The hub 86a of the winding drum 86 is bolted as at 89 to prevent axial movement of the winding drum 86. The winding drum 86 is thus caused to rotate by the hydraulic motor 84 through the output shaft 88 and the hub 86a.

Figure 6:
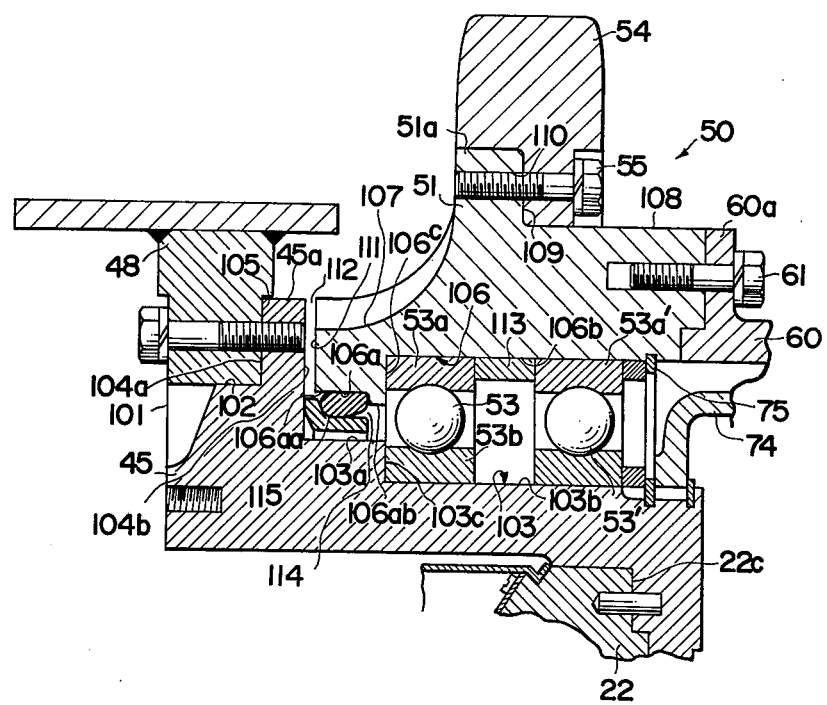
FIG. 6 is a fragmentary and enlarged cross-sectional view partly showing mechanical parts around bearings disposed between the motor housing and a rotating assembly.

With reference to FIG. 6, the stationary frame structure 48 is shown to have an attachment bore 101 in axial alignment with the output shaft 25. The motor housing 45 has an engaging peripheral portion 102 inserted into and engaging with the attachment bore 101 to be supported by the frame structure 48 with the axially inner most end of the engaging peripheral portion 102 located within the axial width of the attachment bore 101, and a projecting peripheral portion 103 away from the attachment bore 101. The annular flange 45a has one end face 104a connected with the engaging peripheral portion 101 in face-to-face contact with the opposing face 105 of the frame structure 48 and the other end face 104b connected with the projecting peripheral portion 103. The projecting peripheral portion 103 includes a first diameter segment 103a connected with the other end face 104b of the flange portion 45a and a second diameter segment 103b smaller in diameter than the first diameter segment 103a and connected with the first diameter segment 103a by an annular ledge 103c. The rotating member 51 of the rotating assembly 50 has a cylindrical inner peripheral portion 106 rotatably engaged with the motor housing 45 through the bearings 53 and 53' having opposing faces axially spaced apart from each other at a predetermined interval, a first cylindrical outer peripheral portion 107 extending toward the frame structure 48, a second cylindrical outer peripheral portion 108 extending away from the frame structure 48, and an annular flange portion 51a disposed between and connecting the first and second cylindrical outer peripheral portions 107 and 108 to have a plurality of threaded bores 110 arranged circumferentially equispacedly and extending axially. The flange portion 51a has an engaging face 109 remote from the frame structure 48 to be interposed within the predetermined interval of the bearings 53 and 53'. The sprocket wheel 54 is securely connected to the engaging face 109 of the flange 51a of the rotating member 51 by means of a plurality of bolts 55 each in threaded engagement with each of the threaded bores 110. The rotating member 51 further has an opposing face 111 opposing to the other end face 104b of the flange portion 45a of the motor housing 45 with a smaller gap 112. The cylindrical inner peripheral portion 106 has a first inner peripheral segment 106a connected with the opposing face 111, and a second inner peripheral segment 106b larger in diameter than the first inner peripheral segment 106a and connected with the first inner peripheral segment 106a through an annular ledge 106c in opposing relation with the second diameter segment 103b of the projecting peripheral portion 103. The annular ledge 103c of of the projecting peripheral portion 103 of the motor housing 45 and the annular ledge 106c of the cylindrical inner peripheral portion 106 of the rotating member 51 are adapted to extend in substantially the same plane with each other. The first inner peripheral segment 106a of the cylindrical inner peripheral portion 106 of the rotating member 51 includes a first diameter section 106aa smaller in diameter than the second inner peripheral segment 106b and having one end connected with the opposing face 111 of the rotating member 51 and a second inner diameter section 106ab smaller in diameter than the first inner diameter section 106aa and having one end connected with the other end of the first inner diameter section 106aa and the other end connected with the radially inner end of the annular ledge 106c of the rotating member 51 so that an annular chamber 114 is defined between the first inner diameter segment 106a and the first diameter segment 103a of the projecting peripheral portion 103 of the motor housing 45. A sealing ring 115 is accommodated in the annular chamber 114 to prevent oil from leaking therefrom toward the gap 112. The engaging peripheral portion 102 is made larger in diameter than the first diameter segment 103a of the projecting peripheral portion 103 of the motor housing 45. The bearing 53 is provided between the second diameter segment 103b of the projecting peripheral portion 103 of the motor housing 45 and the second inner peripheral segment 106b of the cylindrical inner peripheral portion 106 of the rotating member 51 with its inner and outer races 53a and 53b respectively contacted with the annular ledges 103c and 106c of the motor housing 45 and the rotating member 51. On the other hand, the bearing 53' is also provided between the second diameter segment 103b of the projecting peripheral portion 103 of the motor housing 45 and the second inner peripheral segment 106b of the cylindrical inner peripheral portion 106 of the rotating member 51 with its outer race 53a' secured to the second inner peripheral segment 106b of the cylindrical inner peripheral portion 106 of the rotating member 51 by a securing means such as the snap ring 75. One end face of the bearing 53' close to the frame structure 48 is adapted to extend in a plane closer than the front face 22c of the inclined plate 22 with respect to the frame structure 48. An axially central plane of the second bearing 53' may be adapted to be closer than the front face 22c of the inclined plate 22 with respect to the frame structure 48. The other end face of the second bearing 53' remote from the frame structure 48 may be adapted to extend in a plane closer than the front face 22c of the inclined plate 22 with respect to the frame structure 48. A cylindrical collar 113 is disposed between the bearings 53 and 53' to have axial ends contacted with the outer races 53a and 53b of the bearings 53 and 53' and an outer peripheral face contacted with the second inner peripheral segment 106b of the cylindrical inner peripheral portion 106 of the rotating member 51.

Any other hydraulic fluid may be employed in the present invention in place of the pressure oil which has been described to actuate the hydraulic motors in the above embodiments.

While it has been described that the hydraulic motor 10 is employed in the driving mechanism in the foregoing embodiment, the hydraulic motor 10 may be used as a hydraulic pump in accordance with the present invention.

According to the present invention, it will be understood that various advantages are obtained as follows.

(1) The hydraulic motor and the reduction gear unit can be individually and readily removed from the opposite sides of the driven rotating wheel without jacking up its own body. Replacement of the hydraulic motor and the reduction gear unit may thus be made with extremely minimal labor and in a relatively short time.

(2) The total width of the hydraulic motor and the reduction gear unit can be made so compact as to be shorter than that of the endless belt, whereby the hydraulic motor and the reduction gear unit do not project outwardly of the width of the endless belt. The hydraulic motor and the reduction gear unit can not come into contact with hard obstacles such as rocks and the like projecting from the ground during running of the caterpillars so that no breakage of the hydraulic motor and the reduction gear unit takes place.

(3) The hydraulic motor can be handled as a single unit, which makes it easy not only to handle the hydraulic motor upon repair or replacement thereof but also to stock it.

It will further be understood that various modifications and changes may be effected without departing from the spirit and scope of the novel concepts of the present invention.

What is claimed is:

1. A crawler type vehicle driving apparatus, comprising in combination:
    a motor housing; and
    a hydraulic motor housed in said motor housing and including a rear casing having a pair of fluid passages provided therein, a timing plate integrally engaged with the front surface of said rear casing and having a pair of distributing passages in fluid communication with said fluid passages in said rear casing, a piston cylinder assembly operably mounted at the front surface of said timing plate and having an axis of rotation, an inclined plate operably mounted at the front surface of said piston cylinder assembly, an output shaft positioned along the axis of said piston cylinder assembly and rotated in unison with said piston cylinder assembly, a retaining member holding said rear casing and said inclined plate so as to permit said hydraulic motor to be easily removed and attached as a single unit from and into said motor housing, positioning means securely mounted on a peripheral portion of said inclined plate to provide desired relative positions of said motor housing and said inclined plate, a bearing positioned between said inclined plate and said output shaft for rotatably engaging said inclined plate with said output shaft, and a holding member for retaining said bearing in its predetermined position.

2. A crawler type vehicle driving apparatus as set forth in claim 1, which further comprises an oil seal positioned in the vicinity of said bearing for sealing leakage of oil between said inclined plate and said output shaft, said holding member also retaining said oil seal in its predetermined position.

3. A crawler type vehicle driving apparatus as set forth in claim 1, wherein said bearing is mounted in an annular groove provided in said inclined plate, and said holding member being attached to said inclined plate and holding said bearing in said groove, said holding member accommodating therein an oil seal for preventing oil from leaking from said hydraulic motor.

4. A crawler type vehicle driving apparatus comprising in combination:

a stationary frame structure having an attachment bore;

a driving mechanism including a motor housing having an engaging peripheral portion inserted into and engaged with said attachment bore to be supported by said frame structure, a projecting peripheral portion projecting away from said attachment bore, and an annular flange portion having one end face connected with said engaging peripheral portion in face-to-face contact with the opposing face of said frame structure and the other end face connected with said projecting peripheral portion, said projecting peripheral portion including a first diameter segment connected with the other end face of said flange portion and a second diameter segment smaller in diameter than said first diameter segment and connected with said first diameter segment by an annular ledge, a hydraulic motor accommodated in said motor housing and having an output shaft therein, a rotating assembly disposed surrounding said projecting peripheral portion of said motor housing and including a rotating member having a cylindrical inner peripheral portion rotatably engaged with said motor housing through first and second bearings having faces axially spaced apart from each other at a predetermined interval, a first cylindrical outer peripheral portion extending towardd said frame structure, a second cylindrical outer peripheral portion extending away from said frame structure, an annular flange portion disposed between and connecting said first and second cylindrical outer peripheral portions to have a plurality of threaded bores arranged circumferentially and extending axially, said flange portion having an engaging face remote from said frame structure to be interposed within said predetermined interval of said bearings, a sprocket wheel securely connected to said engaging face of said flange portion of said rotating member by means of a plurality of bolts each in threaded engagement with each of said threaded bores, said rotating member further having an opposing face opposing the other end face of said flange portion of said motor housing with a predetermined gap, said cylindrical inner peripheral portion having a first inner peripheral segment connected with said opposing face, and a second inner peripheral segment larger in diameter than said first inner peripheral segment and connected with said first inner peripheral segment through an annular ledge in opposing relation with said second diameter segment of said projecting peripheral portion; and said first bearing being provided between said second diameter segment of said projecting peripheral portion of said motor housing and said second inner peripheral segment of said cylindrical inner peripheral portion of said rotating member with its inner and outer races respectively contacted with said annular ledges of said motor housing and said rotating member, while said second bearing is provided between said second diameter segment of said projecting peripheral portion of said motor housing and said second inner peripheral segment of said cylindrical inner peripheral portion of said rotating member with its outer race secured to said second inner peripheral segment of said cylindrical inner peripheral portion of said rotating member by a securing ring; and a cylindrical collar disposed between said bearings to have axial ends contacted with said outer races of said first and second bearings and an outer peripheral face contacted with said second inner peripheral segment of said cylindrical inner peripheral portion of said rotating member;

an endless belt in engagement with said sprocket wheel of said rotating assembly; and a reduction gear unit located in opposing relation with the face of said motor housing remote from said frame structure and including a sun gear detachably connected with said output shaft of said hydraulic motor, a plurality of planet gears meshing with said sun gear, and an output ring gear meshing with said planet gears and securely connected with said rotating member so as to transmit power from said hydraulic motor to said rotating member at a reduced speed and an increased torque.

5. A crawler type vehicle driving apparatus as set forth in claim 4, said annular ledge of said projecting peripheral portion of said motor housing and said annular ledge of said cylindrical inner peripheral portion of said rotating member being adapted to extend in substantially the same plane with each other.

6. A crawler type vehicle driving apparatus as set forth in claim 4, wherein said first inner peripheral segment of said cylindrical inner peripheral portion of said rotating member includes a first inner diameter section having one end connected with said opposing face of said rotating member and a second inner diameter section smaller in diameter than said first inner diameter section and having one end connected with the other end of said first inner diameter section and the other end connected with the radially inner end of said annular ledge of said rotating member so as to define an annular chamber between said first inner peripheral segment and said first diameter segment of said projecting peripheral portion of said motor housing to accommodate a seal ring therein, said engaging peripheral portion being larger in diameter than said first diameter segment of said projecting peripheral portion of said motor housing.

7. A crawler type vehicle driving apparatus as set forth in claim 4, wherein said first inner peripheral segment of said cylindrical inner peripheral portion of said rotating member includes a first inner diameter section smaller in diameter than said second inner peripheral segment and having one end connected with said opposing face of said rotating member and a second inner diameter section smaller in diameter than said first inner diameter section and having one end connected with the other end of said first inner diameter section and the other end connected with the radially inner end of said annular ledge of said rotating member so as to define an annular chamber between said first inner peripheral segment and said first diameter segment of said projecting peripheral portion of said motor housing to accommodate a seal ring therein, said engaging peripheral portion being larger in diameter than said first diameter segment of said projecting peripheral portion of said motor housing.

8. A crawler type vehicle driving apparatus as set forth in claim 4, wherein said hydraulic motor includes a rear casing having a pair of fluid passages provided therein, a timing plate integrally engaged with the front surface of said rear casing and having a pair of distributing passages in fluid communication with said fluid passages in said rear casing, a piston cylinder assembly operably mounted at the front surface of said timing plate and having an axis of rotation, an inclined plate operably mounted at the front surface of said piston cylinder assembly and having a front face in contact with the axial inner end face of said motor housing, an output shaft positioned along the axis of said piston cylinder assembly to extend throughout said inclined plate and rotated in unison with said piston cylinder assembly, positioning means connecting said inclined plate and said motor housing to provide desired relative positions of said motor housing and said inclined plate, a bearing positioned between said inclined plate and said output shaft for rotatably engaging said inclined plate with said output shaft, and a holding member for retaining said bearings in its predetermined position.

9. A crawler type vehicle driving apparatus as set forth in claim 8, wherein said inclined plate is connected at its front face to an axial inner end face of said motor housing by means of a positioning pin.

10. A crawler type vehicle driving apparatus as set forth in claim 8, wherein said second bearing is adapted to have one end face close to said frame structure and extending in a plane closer than said front face of said inclined plate with respect to said frame structure.

11. A crawler type vehicle driving apparatus as set forth in claim 8, wherein said second bearing is adapted to have an axially central plane closer than said front face of said inclined plate with respect to said frame structure.

12. A crawler type vehicle driving apparatus as set forth in claim 8, wherein said second bearing is adapted to have the other end face remote from said frame structure and extending in a plane closer than said front face of said inclined plate with respect to said frame structure.

13. A crawler type vehicle driving apparatus comprising in combination: a frame structure having an attachment bore; a driving mechanism including a motor housing having an engaging peripheral portion inserted into and engaged with said attachment bore to be supported by said frame structure, and a projecting peripheral portion projecting away from said attachment bore, an annular flange portion having one end face connected with said engaging peripheral portion in face-to-face contact with the opposing face of said frame structure and the other end face connected with said projecting peripheral portion, said projecting peripheral portion including a first diameter segment connected with the other end face of said flange portion and a second diameter segment smaller in diameter than said first diameter segment and connected with said first diameter segment by an annular ledge, a hydraulic motor accommodated in said motor housing and including a rear casing having a pair of fluid passages provided therein, a timing plate integrally engaged with the front surface of said rear casing and having a pair of distributing passages in fluid communication with said fluid passages in said rear casing, a piston cylinder assembly operably mounted at the front surface of said timing plate and having an axis of rotation, an inclined plate operably mounted at the front surface of said piston cylinder assembly and having a front face in contact with the axial inner end face of said motor housing, an output shaft positioned along the axis of said piston cylinder assembly to extend throughout said inclined plate and rotated in unison with said piston cylinder assembly, positioning means connecting said inclined plate and said motor housing to provide desired relative position of said motor housing and said inclined plate, a bearing positioned between said inclined plate and said output shaft for rotatably engaging said inclined plate with said output shaft, and a holding member for retaining said bearing in its predetermined position, a rotating assembly disposed surrounding said projecting peripheral portion of said motor housing and including a rotating member having an cylindrical inner peripheral portion rotatably engaged with said motor housing through first and second bearings having opposing faces axially spaced apart from each other at a predetermined interval, a first cylindrical outer peripheral portion extending toward said frame structure, a second cylindrical outer peripheral portion extending away from said frame structure, and an annular flange portion disposed between and connecting said first and second cylindrical outer peripheral portions to have a plurality of through bores arranged circumferentially and extending axially, said flange portion having an engaging face to be interposed within said predetermined interval of said bearings, a sprocket wheel securely connected to said engaging face of said flange portion of said rotating member by coupling means to be inserted through said through bores; said rotating member further having an opposing face opposing the other end face of said flange portion of said motor housing with a predetermined gap, said cylindrical inner peripheral portion having a first inner peripheral segment connected with said opposing face, and a second inner peripheral segment larger in diameter than said first inner peripheral segment and connected with said first inner peripheral segment through an annular ledge in opposing relation with said second diameter segment of said projecting peripheral portion; and said first bearing being provided between said second diameter of said projecting peripheral portion of said motor housing and said second inner peripheral segment of said cylindrical inner peripheral portion of said rotating member with its inner and outer races respectively contacted with said annular ledges of said motor housing and said rotating member, while said second bearing is provided between said second diameter segment of said projecting peripheral portion of said motor housing and said second inner peripheral segment of said cylindrical inner peripheral portion of said rotating member with its outer race secured to said second inner peripheral segment of said cylindrical inner peripheral portion of said rotating member by a securing ring; and which further comprises a cylindrical collar disposed between said bearings to have axial ends contacted with said outer races of said first and second bearings and an outer peripheral face contacted with said second inner peripheral segment of said cylindrical inner peripheral portion of said rotating member; an endless belt in engagement with said sprocket wheel of said rotating assembly; and a reduction gear unit located in opposing relation with the face of said motor housing remote from said frame structure and including a sun gear detachably connected with said output shaft of said hydraulic motor, a plurality of planet gears meshing with said sun gear, and an output ring gear meshing with said planet gears and securely connected with said rotating member so as to transmit power from said hydraulic motor to said rotating member at a reduced speed and an increased torque, wherein said second bearing is adapted to have one end face close to said frame structure and extending in a plane closer than said front face of said inclined plate with respect to said frame structure.

14. A crawler type vehicle driving apparatus as set forth in claim 13, wherein said second bearing is adapted to have the other end face remote from said frame structure extending in a plane closer than said front face of said inclined plate with respect to said frame structure.

15. A crawler type vehicle driving apparatus as set forth in claim 13, wherein said second bearing is adapted to have an axially central plane closer than said front face of said inclined plate with respect to said frame structure.

16. A crawler type vehicle driving apparatus as set forth in claim 13, wherein said first inner peripheral segment of said cylindrical inner peripheral portion of said rotating member includes a first inner diameter section having one end connected with said opposing face of said rotating member and a second inner diameter section smaller in diameter than said first inner diameter section and having one end connected with the other end of said first inner diameter section and the other end connected with the radially inner end of said annular ledge of said rotating member so as to define an annular chamber between said first inner peripheral segment and said first diameter segment of said projecting peripheral portion of said motor housing to accommodate a seal ring therein, said engaging peripheral portion being larger in diameter from said first diameter segment of said projecting peripheral portion of said motor housing.

17. A crawler type vehicle driving apparatus as set forth in claim 13, said annular ledge of said projecting peripheral portion of said motor housing and said annular ledge of said cylindrical inner peripheral portion of said rotating member being adapted to extend in substantially the same plane with each other.

* * * * *